Figure 1:
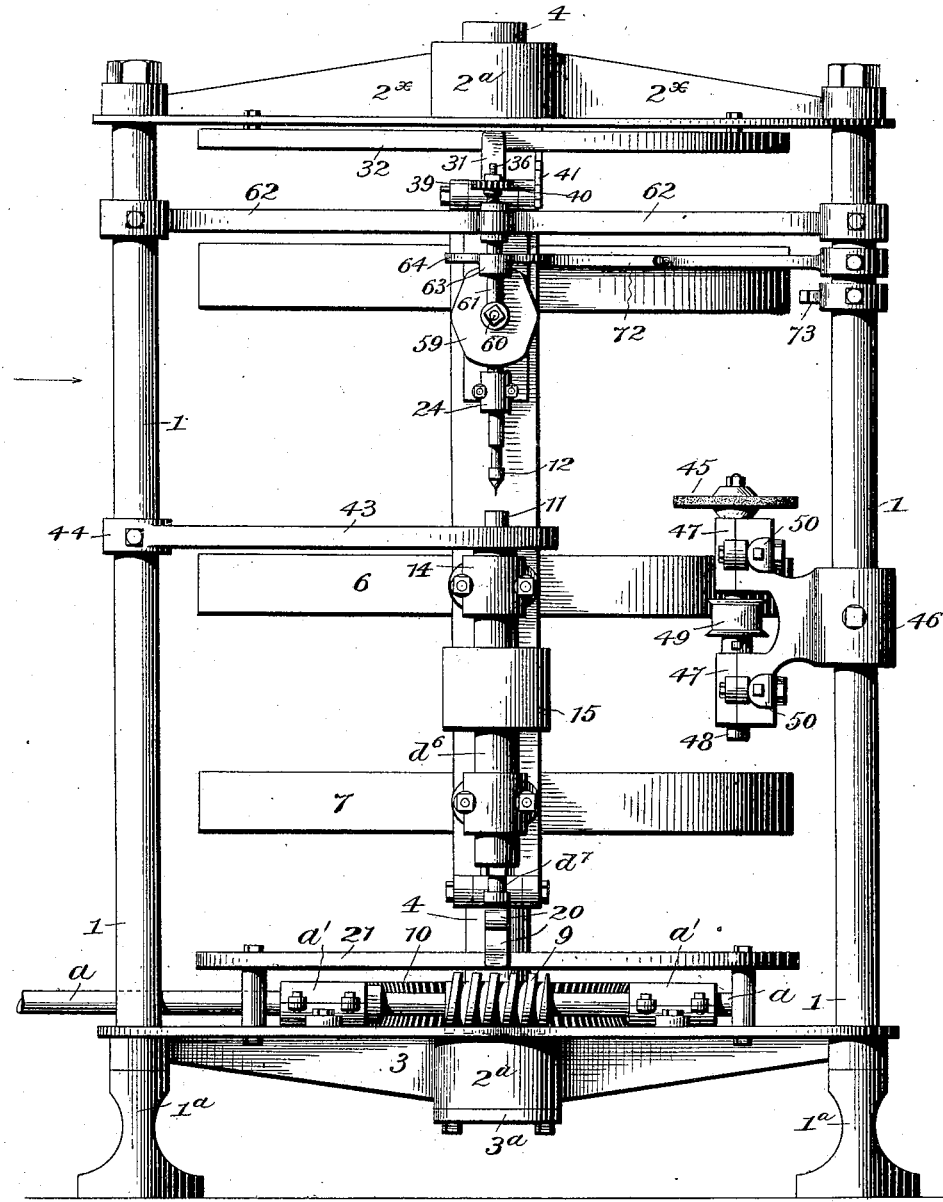

F. M. HOPKINS.
BUTTON MAKING MACHINE.
APPLICATION FILED JUNE 1, 1906.

981,564.

Patented Jan. 10, 1911.

8 SHEETS—SHEET 1.

Witnesses:
Jas. E. Hutchinson
Willis F. Rowe

Inventor:
Fred M. Hopkins,
By Louis Block, Attorney

F. M. HOPKINS.
BUTTON MAKING MACHINE.
APPLICATION FILED JUNE 1, 1906.

981,564.

Patented Jan. 10, 1911.

8 SHEETS—SHEET 2.

Witnesses:
Jas. E. Hutchinson.
Willis F. Rowe

Inventor:
Fred M. Hopkins,
By Norris Block, Attorney

F. M. HOPKINS.
BUTTON MAKING MACHINE.
APPLICATION FILED JUNE 1, 1906.

981,564.

Patented Jan. 10, 1911.
8 SHEETS—SHEET 3.

Witnesses:
Jas. E. Hutchinson
Millie F. Rowe

Inventor:
Fred M. Hopkins,
By Lorrie Block Attorney

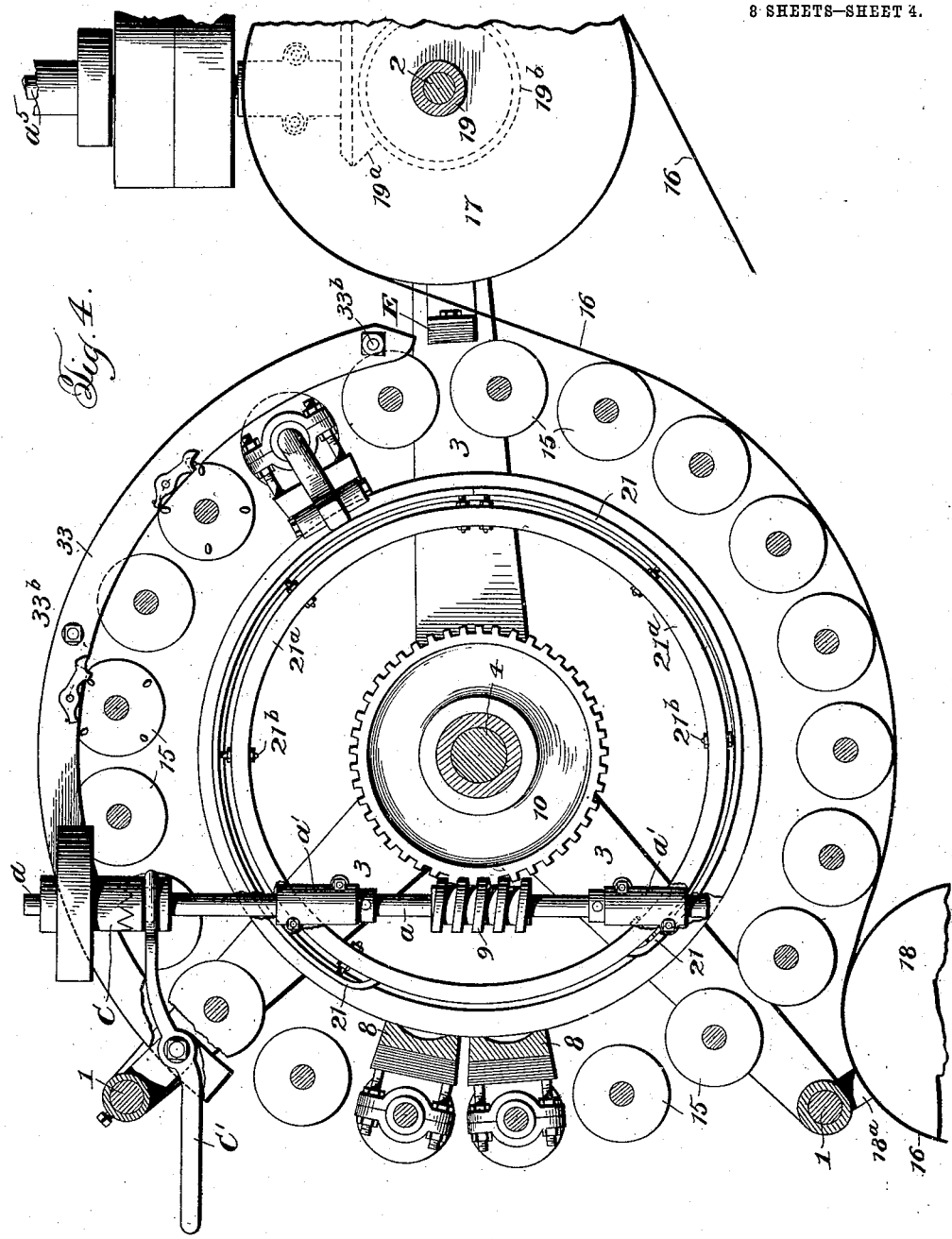

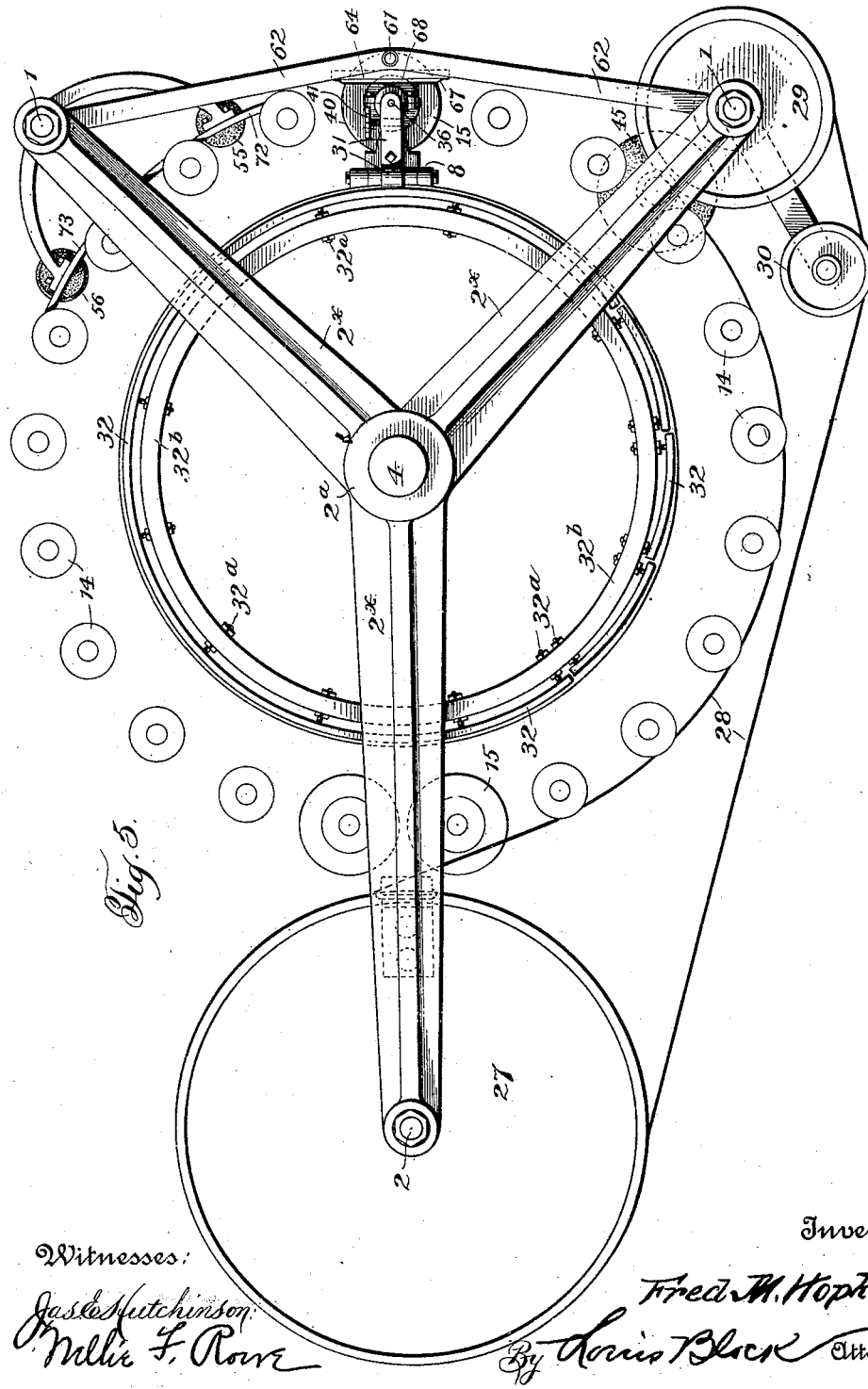

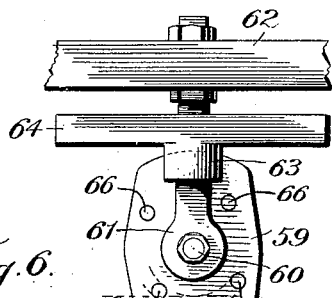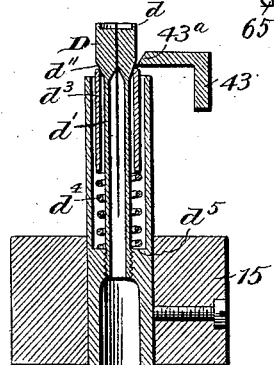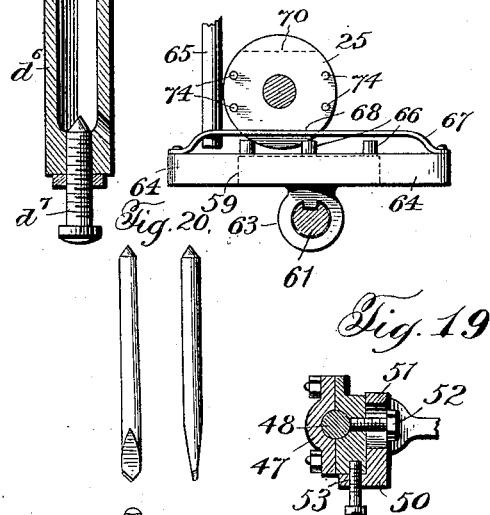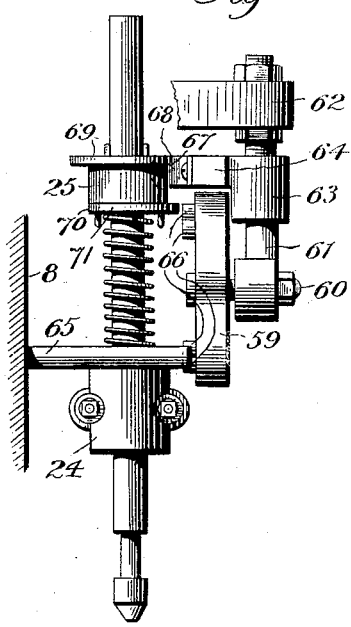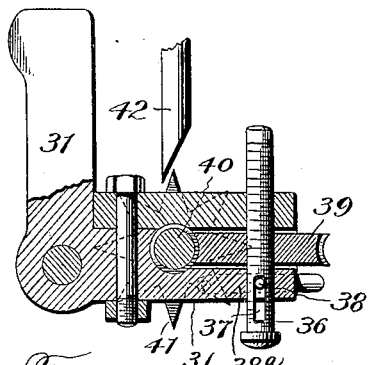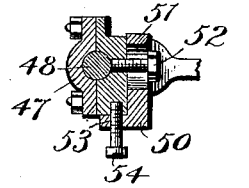

F. M. HOPKINS.
BUTTON MAKING MACHINE.
APPLICATION FILED JUNE 1, 1906.

981,564.

Patented Jan. 10, 1911.

8 SHEETS—SHEET 7.

Witnesses:
Jas. C. Hutchinson.
Nellie F. Rowe

Inventor:
Fred M. Hopkins,
By Norris Block
Attorney

THE NORRIS PETERS CO., WASHINGTON, D. C.

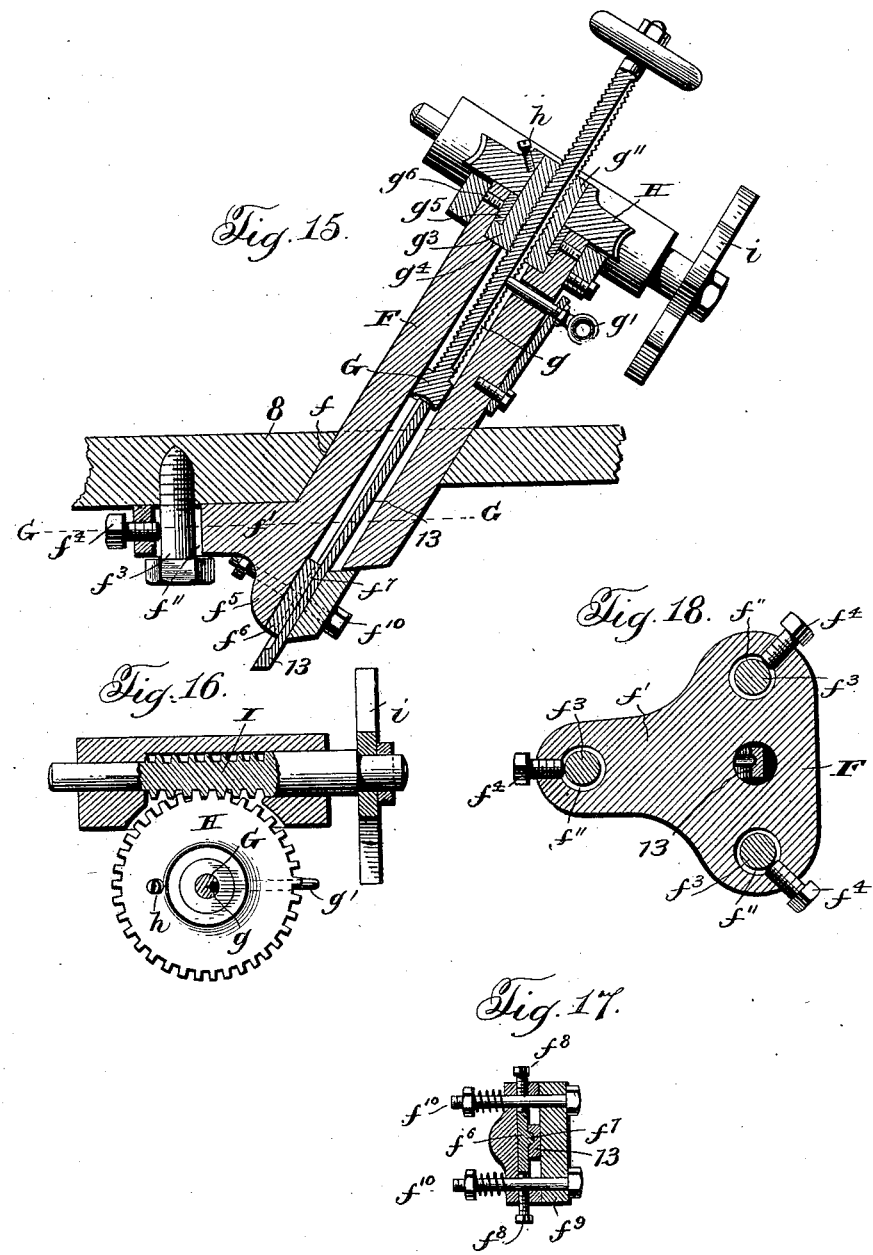

UNITED STATES PATENT OFFICE.

FRED M. HOPKINS, OF MUSCATINE, IOWA, ASSIGNOR OF ONE-THIRD TO WILLIAM C. HOPKINS AND ONE-THIRD TO HENRY UMLANDT, BOTH OF MUSCATINE COUNTY, IOWA.

BUTTON-MAKING MACHINE.

981,564. Specification of Letters Patent. Patented Jan. 10, 1911.

Application filed June 1, 1906. Serial No. 319,785.

*To all whom it may concern:*

Be it known that I, FRED M. HOPKINS, a citizen of the United States, residing at Muscatine, in the county of Muscatine and State of Iowa, have invented certain new and useful Improvements in Button-Making Machines, of which the following is a specification, reference being had therein to the accompanying drawing.

This invention relates to improvements in button making machines and more particularly that type of machines wherein upon the feeding of blanks of a predetermined character thereto, the same will in a cycle of operation of the machine be automatically faced, centered, and drilled without displacing the blanks from the positions they initially occupy when placed in and held by their carrying chucks, the buttons when subsequently released from the chucks being in a finished state save for an additional polishing treatment when necessary or desired.

Novel characteristics of my improved machine are the provision of a unitary structure which includes a series of carrying chucks, facing tools, and drills, the devices of each series being mounted upon a single traveling support whereby they occupy with respect to each other a relatively fixed or permanent operating position, in contradistinction to such machines as employ a series of chucks arranged to carry the button blanks to facing tools mounted on one support and subsequently to drills mounted on another support, or vice versa; the provision of a single rotary carrier or support for the several series of devices as aforesaid having a number of bed plates, one for each series, with means mounted at opposite portions of said plate coöperating with other means secured to the upper and lower portions of the rigid frame-work of the machine, to at desired times force the chucks and drills into operative relation whereby the strain incident to this step of the operation is balanced at opposite ends of the rotary carrier and distributed therethrough and to the rigid frame-work of the machine; means for automatically and gradually feeding the drill to accommodate for wear at the point thereof; means for automatically sharpening the point of the drill, and more specifically means for effecting turning of the drill point to secure an even and symmetrical sharpening thereof; instrumentalities for adjusting, automatically sharpening, and automatically and gradually feeding the face of the tool to accommodate for its wear; a brake for stopping the operation of the chucks when passed beyond the facing tools after the facing operation; and means for automatically releasing the chucks from holding engagement with the button to permit ready withdrawal of the buttons from the machine and the introduction of additional blanks.

All of the foregoing improvements as also other novel features and details of construction and arrangement of parts of a machine made in accordance with my invention will be more apparent from the detailed description hereinafter contained when read in connection with the accompanying drawings forming part hereof and wherein a convenient embodiment of the invention is illustrated.

Figure 2:
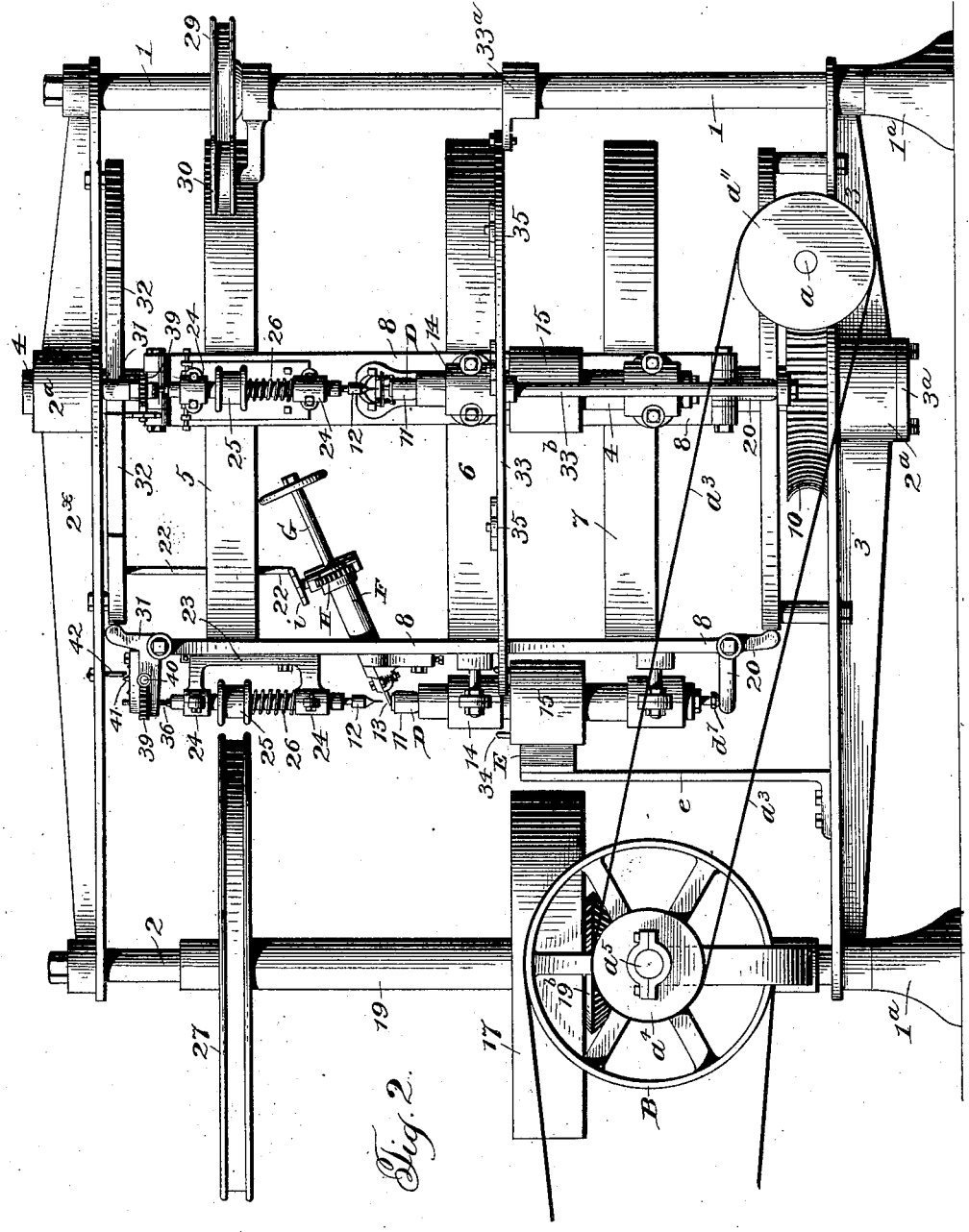
Figure 5:
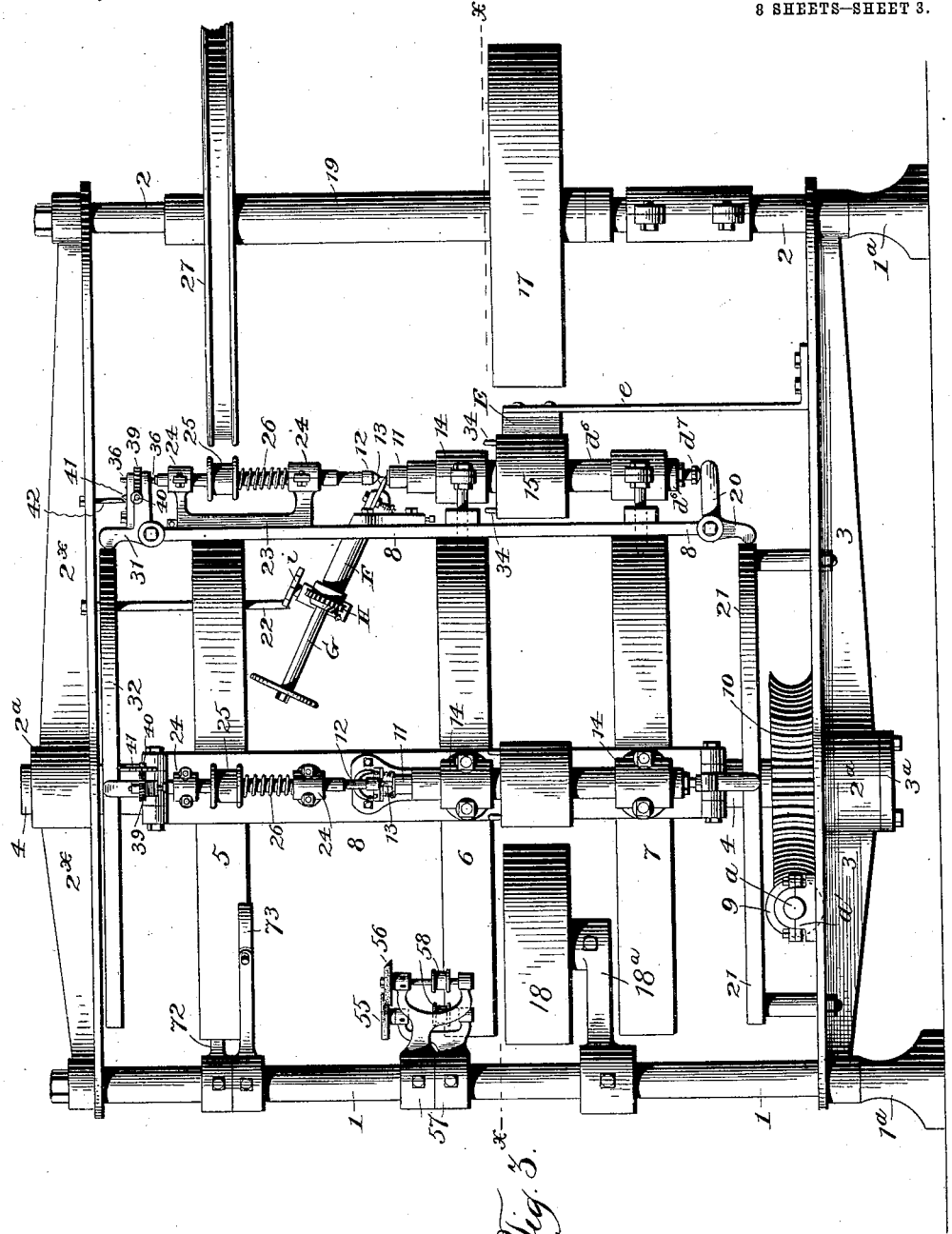
Figure 8:
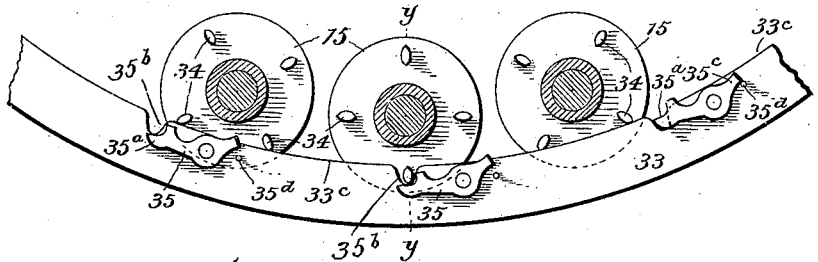
Figure 9:
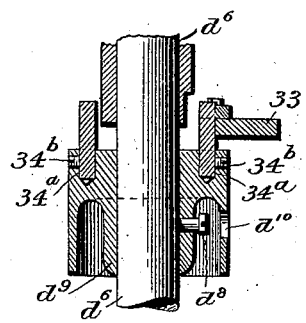
Figure 10:
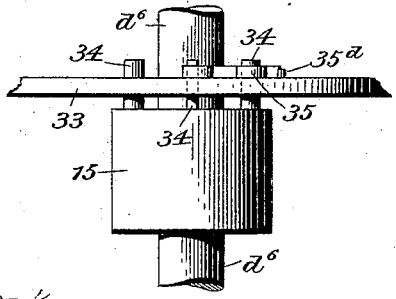
Figure 14:
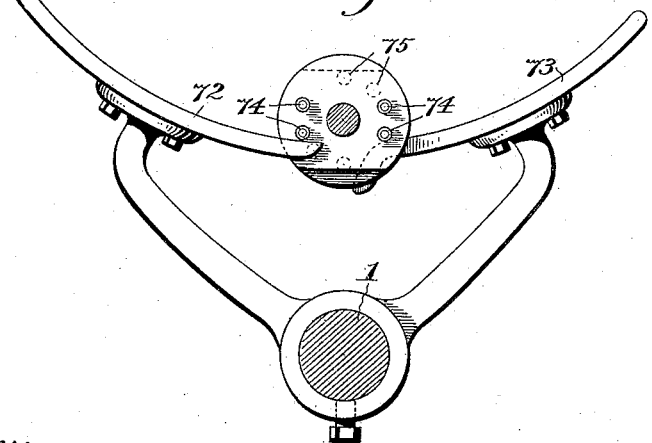

In the drawings: Figure 1 is a front elevation of the machine, Fig. 2 is a side elevation looking in the direction of the arrow, Fig. 1, Fig. 3 is an elevation corresponding to Fig. 2, looking at the opposite side of the machine, Fig. 4 is a horizontal sectional view taken on the line $x$—$x$ of Fig. 3 and looking in a downward direction, only a few bed plates being shown, and parts being broken away, Fig. 5 is a plan view of the machine occupying the position shown in Fig. 2, and some of the devices being omitted for the sake of simplification and clearness, Fig. 6 is a detail vertical sectional view of one of the chucks and the device for automatically causing the same to open to receive or permit the withdrawal of the blank or button as the case may be, Fig. 7 is a detail sectional view illustrative of the means for automatically and gradually feeding the drills to allow for the wear at the points of the latter, Fig. 8 is an enlarged detail plan showing the relative association of parts and means for intermittently moving the chucks and blanks carried thereby to present different portions of the blank to the drills to secure the desired number of thread apertures therein, Fig. 9 is a sectional view on the line Y, Y, of Fig. 8, Fig. 10 is a fragmentary elevation of Fig. 8, Figs. 11, 12 and 13 are a front elevation, side elevation, and plan, partly in section, of the means for insuring the turning of the drill points for the presentation of opposite sides thereof to the grinding or sharpening devices therefor, Fig. 14 is a plan view of the guides which lead the drills in proper position to the grinding or sharpening means after their engagement through the medium of the devices disclosed in the three immediately preceding figures, Fig. 15 is a longitudinal sectional view through the facing tool, its mounting, and its feeding means, Fig. 16 is a transverse section through said feeding means; and Fig. 17 is a similar section through the lower portion of Fig. 15 showing the manner of and means for adjustably securing the facing tool in place; Fig. 18 is a vertical sectional view on the line G, G of Fig. 15; Fig. 19 is a sectional view of one of the adjustable bearing boxes of the grinding wheel for the facing tool; and Fig. 20 is a detail view of one of the drills employed in the machine, Fig. 21 is a fragmentary plan view illustrating the relation of the drill to the shaping tool and blank holding device.

To impart a general understanding of the operation of my machine, and thus facilitate an appreciation of the various details as will hereinafter more fully appear, it may be here observed that a complete cycle of operations of the associated parts and mechanisms embraces first, the presentation of the chuck in open condition to the operator for the reception of the previously formed blanks, which latter may be of bone, pearl, or other suitable material; second, the automatic grasping of the blanks within the chuck to hold the same against substantial displacement or escape; third, the elevation of the chuck into operative relation to the facing or shaping tool and rotation of the chuck and blank against the cutting edge of the facing or shaping tool whereby the blank is properly centered in the mouth of the chuck and also given its predetermined surface formation dependent only upon the character of the tool employed, and the angular relation of said tool with respect to the blank being such that in producing such surface formation it shaves or shears the blank as distinguished from scraping or scratching the same as is obviously the result where the shaping tool is disposed in a plane at right angles to that in which the blank lies; fourth, reversing the rotation of the chuck and shaped blank while maintaining engagement of the blank with the shaping tool whereby the movement of the blank being no longer in opposition to the cutting edge of the tool, the latter is converted into purely a holding or retaining device for the blank while being drilled, and depressing and rotating the drill to bore the initial aperture through the blank, after which the blank is turned as an incident to the turning of the chuck intermittently to present other portions of the blank to the drill and apertured in consonance with the complementary intermittent raising and lowering of said drill; and finally the presentation of the drill and facing tool to, and treatment by, their respective sharpening and grinding tools. It is also to be noted that at suitable points and times in the operation, the facing and drilling tools are fed by slight gradual movements toward the chuck to maintain them in constant operative relation thus allowing for their necessary wearing away at the cutting points or edges.

Referring now more specifically to the drawings, wherein corresponding reference characters designate like parts in the several views, 1 represents a pair of forelegs or columns and 2 a rear leg or column occupying a plane centrally between the forelegs, the same being formed with suitable feet $1^a$ adapted to rest upon any suitable foundation, and $2^x$ and 3 top and bottom castings of Y-shaped formation the shorter arms of which are rigidly connected to the forelegs 1 and the longer arm of which is connected to the rear leg 2. These castings are each provided with approximately centrally disposed circular bearings $2^a$ for the reception of a rotatable shaft 4 of a carrier to be soon described, the bottom of the lower bearing being closed by a case-hardened steel plate $3^a$ upon which said shaft 4 bears. Upon this shaft 4 are rigidly secured so as to rotate therewith a series of rings or disks, three being shown, the top one of which is indicated at 5, the lower at 7, and the central or intermediate one at 6, and arranged around the peripheries of these rings or disks are a plurality of bed plates 8 (conveniently twenty-one in number) each of which carries an independent series of button working implements. These bed-plates with the series of button working implements carried thereby may each be styled a separate and complete button blank treating unit.

Any means found expedient may be employed to rotate the shaft 4 and implement carriers thereon, that shown consisting of a worm 9 meshing with a worm wheel 10 on the shaft 4, the shaft $a$ of the worm being mounted in suitable boxes $a'$ on the casting 3, and driven through the medium of a pulley $a''$ at the end of said shaft which is geared by a belt $a^3$ to a pulley $a^4$ on the main drive shaft of the machine $a^5$, to which latter a drive wheel or pulley B receiving its power from any convenient source is secured. The pulley $a''$ may be readily connected with or disconnected from the shaft $a$ when it is desired to start or stop the rotation of the shaft 4 and the carrier thereon, by a clutch C shiftable by a lever $C'$.

Reverting to the supporting or bed plate 8, it will be seen that each of these carries at the lower portion thereof an upwardly facing chuck 11 and at its upper portion an oppositely disposed drill 12, while occupying an angular position intermediate the chuck and drill is a facing tool 13. The chuck consists of a number of segmental jaw sections D having rims $d$ for grasping the periphery of the blank or buttons, each section having an elongated shank $d'$ and outwardly beveled or inclined shoulders $d''$, the shoulders being normally engaged by the upper end of a sleeve $d^3$ which, working under the pressure of a spring $d^4$, force the jaw sections together and into engagement with the buttons or blanks and effectively hold the latter in place. The spring $d^4$ just referred to abuts at its opposite end against an offset $d^5$ upon the interior of a tubular holder $d^6$ (see Fig. 6) an adjusting bolt $d^7$ having threaded engagement with the lower closed end of this holder whereby the chucks are afforded an adjustable abutment for engagement by their elevating devices. The chucks are secured in place on the rotary carrier by means of collars 14 bolted to the plates 8 and embracing the holders of the chucks. A pulley 15 on the holder $d^6$ of each chuck is provided to rotate the chuck at proper times during the rotation of the rotary carrier, such rotation being dependent upon the elevation of the chuck into the horizontal plane of, and engagement with, a driving belt 16 (Fig. 4) passing around a drive pulley 17 and an idler 18, the latter being mounted upon one of the forelegs or columns 1 through a bracket $18^a$, while the former is secured to and rotates with a sleeve 19 on the column 2 receiving its movement through the medium of intermeshing beveled gears $19^a$, $19^b$, one rigid with the pulley 17 and the other rigid with the shaft $a^5$ of the main drive wheel B. The elevation of the chuck as suggested is effected by means of a freely pivoted angular or bell-crank lever 20 mounted at the lower end of the bed plate 8, the upper or horizontal arm of which abuts the lower end of the chuck or more specifically the adjusting bolt $d^7$ thereof, while the vertical or depending arm of said lever travels around and engages a horizontally arranged cam 21 rigidly secured in any desirable manner to the casting 3, the securing means preferably employed and shown in the drawings including a ring $21^a$ bolted to said casting and adjustable bolts $21^b$ passing transversely therethrough and carried by the sections of the cam 21 whereby the latter may be properly adjusted in an obvious manner.

A brake E secured to an upright $e$ bolted to the rear arm of the casting 3 is arranged within the path of movement of the rotating pulleys 15 for the chucks whereby the rotation of the same and chucks is stopped immediately upon their traveling beyond and out of engagement with the belt 16.

In the same vertical plane as each chuck, and arranged so that it will immediately engage the blank therein upon elevation of the chuck as before mentioned, is the facing tool 13, the latter, as will be readily appreciated from the drawings, being mounted on and carried by the bed plate 8 whereby it is angularly disposed with respect to the chuck and button blank therein to enable the tool in facing the blank under rotation of the latter to act thereon with a clean shaving or shearing cut, the results of which I have found are far superior to those obtained by tools placed at right angles to the plane of the blank and by which the blank is simply scraped or scratched to the surface configuration sought. The details of this centering and shaping tool will now be described particularly, reference being made to Fig. 15. The bed plate 8 has a transversely disposed inclined aperture $f$ through which a tubular holder F for the tool 13 passes, the end of this holder outside of the plate 8 being formed to a bracket $f'$ having enlarged apertures $f''$ at the three corners thereof for the reception of securing bolts $f^3$ having threaded engagement with the bed plate 8, and said bolts being of a diameter considerably less than that of the apertures $f''$ whereby the bracket $f'$ and holder F may be adjusted in any direction within a given limit of movement to bring the tool 13 into proper position relatively to the other devices of the machine, the adjustment being maintained through the medium of locking bolts $f^4$ adjustable through threaded apertures in the edges of the bracket $f'$ to bind upon the securing bolts $f''$. Projecting outwardly from the bracket $f'$ is a lug or seat $f^5$ upon which rests a laterally adjustable slide $f^6$ having a longitudinal rib $f^7$ fitting a complementary groove in the inner face of the shank of the tool 13 whereby the latter may slide upon said rib and be adjusted lengthwise thereof while being held against lateral movement independently of the slide $f^6$, the lateral adjustment of said slide and tool being obtained by adjusting bolts $f^8$ engaging the edges of the former. A back plate $f^9$ holds the tool in place on the rib $f^7$, said back plate being in turn held in place by yieldable fastening devices in the nature of adjustable spring-pressed bolts $f^{10}$. A screw threaded plunger G bears upon the upper end of the shank of the tool 13 and is designed when forced downwardly thereagainst in a manner to be now defined to cause a gradual outwardly sliding or feeding movement of the tool to accommodate for the wearing away of the cutting points thereof. The plunger is grooved longitudinally as at $g$ for the reception of a spring-pressed pin $g'$ which will prevent rotation thereof. The means for feeding the plunger comprises an internally threaded sleeve $g''$ flanged at its lower end $g^3$ and held in place between the shoulder $g^4$ on the holder F and retaining ring $g^5$ by screws $g^6$ fastened through the holder and into the retaining ring; a worm wheel H secured by a bolt $h$ to the threaded sleeve $g''$ a worm I meshing with said worm wheel; and a star wheel $i$ on said worm so arranged that in its travel with the rotary carrier around the machine it will come in engagement with a detent 22 suspended from the upper casting 2 which will turn the star wheel the extent of one tooth thereof and correspondingly feed the facing tool.

Remembering that the facing tool completes its function as such during the period of engagement and rotation of the chucks by the belt 16 and that the rotation of chuck is stopped by the brake E immediately upon disengagement of these parts it will be seen that the faced blank is now ready for the drilling operation to make the thread apertures in said blanks and during this operation, as will hereafter more clearly appear the facing tool is converted into a holder, or retaining device for the blanks. As has heretofore been brought out 12 indicates the drills, one on each bed plate 8 arranged directly above the chucks and facing tool thereon, the drill being secured in place by a bracket 23 adjustably mounted on said bed plate and having bearings or collars 24 in which the drill chuck or holder may slide vertically. The drill has a driving pulley 25 and is normally held upwardly out of operative relation to the work by a coil spring 26 bearing at its lower end against the lower bearing or collar 24 of the bracket 23 and at its upper end against the under surface of said pulley 25, the latter of course being rigid upon the drill holder or chuck. The rotating means for the drill just suggested comprises a driving pulley 27 on the rotatable sleeve 19 around and from which a belt 28 (Fig. 5) passes to an idler 29 on one of the fore legs or columns 1, an adjustable slack take-up device 30 being also mounted for adjustment upon one of said fore legs 1 and engaging the outer run of said belt. At the proper time the drill holders are depressed to bring their drills into operation on the blanks, the depressing means in this instance being in general respects the same as the elevating means for the chucks heretofore defined in that the same includes an angular or bell-crank lever 31 freely pivoted at the upper end of the bed plate 8 whereby its horizontal or lower arm will engage the upper end of the drill while its vertical or upper arm will successively engage a number of cams 32 adjustably secured through the medium of bolts $32^a$ and a ring $32^b$ secured to the top casing 2 of the frame of the machine, the number of these cams differing according to the character of work to be performed, four appearing in the present instance inasmuch as the machine disclosed herein is designed to drill a like number of holes or apertures in each blank. Now as the drill is successively depressed under the influence of the cams 32 and against the tension of the restoring or elevating springs 26, some means must be provided for turning the chucks and blanks carried thereby to present the different portions of the blank to be bored to the drills, it being understood that the parts are so arranged that each of said turning movements takes place while the drill is elevated intermediate its depressing movements by the cams 32. The turning means will now be considered. A segmental guide plate 33 is secured at one end to one of the fore legs 1 of the frame by means of a bracket $33^a$ and supported at its opposite end and between its ends by posts $33^b$ (Figs. 2 and 4) to occupy a position slightly above the plane of the upper surface of the pulley 15 of the chuck when the chuck is in raised position whereby in the movement of the rotary carrier the inner edge $33^c$ of this guide plate will engage pegs 34 projecting upwardly from said pulley. Upon the initial engagement of the chucks with this guide plate and while the first hole is being bored through the blank, it will be observed that two of the pegs 34,—of which there are four arranged equidistantly apart and from the center of the chuck,—will simply ride along the edge $33^c$ of the guide and prevent turning of the chuck. As soon, however, as the foremost peg in the line of travel of the carrier comes into engagement with the jaw $35^a$ of a pawl 35 pivoted on the guide 33, said peg will be temporarily held in opposition to the movement of the carrier and the chuck thereby rotated one-quarter turn until the next adjoining peg contacts with the edge $33^c$ when the peg previously caught by the pawl will ride out of engagement with the pawl which has in the meantime been pushed aside (see Fig. 8), the inner edge of the guide plate being cut away as at $35^b$ for that purpose. The chuck will then be held against further turning movement until engagement is made with the next pawl and in the interim the second hole will have been bored in the blank. Now if the pawl 35 be permitted to remain in the position in which the caught peg 34 leaves it, i. e. pushed aside from the edge $33^c$ it would not be in proper position to engage the pegs of the on-coming chuck; and to insure that the pawl shall be positively returned to its initial or operating position I provide the same with a tail piece $35^c$ adapted to project inwardly beyond said edge $33^c$ into the path of movement of the released peg 34 so that the peg will force said tail piece outwardly and thereby rock the jaw of the pawl inwardly to the desired position, to properly engage the nearest peg of the on-coming chuck, a stop $35^d$ being afforded to limit the outward movement of the tail piece $35^c$ and inward movement of the jaw $35^a$. The operation of the succeeding pawls no matter how many in number, being the same as that just described, they need not be further referred to. A feature, however, to be noted at this point is that the rotation or turning of the chuck while traveling along the guide plate 33 and under the action of the pawl 35 is in a direction just the reverse of that while the chucks are rotated by the belt 16, so that although the facing tool 13 is still in contact with the blank theretofore acted on thereby, the blank no longer moves in opposition to the cutting edge of said facing tool but slips freely around underneath the same and from the back thereof. Thus the facing tool is converted into and operates during the drilling operations as a holding device for the previously faced blank carried by the chuck.

The stubs or pegs 34 are removably secured in the pulley 15 (Fig. 9) through the medium of apertures $34^a$ furnished for the reception of their inner ends in said pulley and binding screws $34^b$ screwed through the peripheral portion of the pulley into the pegs. From this view it will also be seen that the pulley is in turn made fast to the chuck holder $d^6$ by a large binding screw $d^8$ passing through an internal flange or collar $d^9$ of the pulley and introduced through an aperture $d^{10}$ in the rim thereof. The means for securing a gradual and automatic downward feeding of the drill to allow for the wearing away thereof at the point embraces mechanism associated with the bell crank lever 31 for obtaining a slightly increasing depression of the drill under the action of said lever and the cam which engages it and comprises a presser foot 36, the shank of which is slotted as at 37 and sleeves through the lower or horizontal arm of the lever whereby vertical movement of the presser foot may be had, a pin 38 carried by a spring $38^a$ on the lever and entering the slot 37 preventing turning and escape thereof, and an internally threaded worm wheel 39 meshing with a star wheel and detent controlled worm 40 constituting the means for lowering the presser foot in the lever. The star wheel is represented at 41 and the detent at 42, the former being mounted on the shaft of the worm 40 and the latter on the upper casting $2^x$, so that the star wheel is turned the extent of one tooth at each revolution of the machine.

After the button blanks are faced and drilled, means should be provided to automatically release the grip of the chucks upon the buttons to facilitate their withdrawal from the machine and the introduction of untreated blanks in lieu thereof, and for this purpose I employ an inwardly flanged or angle bar 43 beveled at its edge $43^a$ and secured by a bracket 44 to one of the forelegs 1 in a position to extend around a portion of the front of the machine and into the path of movement of the chuck after the drills have receded therefrom and the chucks lowered, whereby the edge $43^a$ will engage and force inwardly the sleeve $d^3$ of the chuck against the tension of the spring $d^4$, thus permitting the jaw sections D to spring apart or separate. The facing tool 13 is kept bright and keen by an emery or other wheel 45 with which the tool contacts in the rotary movement of the carrier, the wheel being supported by a bracket 46 on one of the forelegs 1, the bracket having a pair of bearing boxes 47 for the shaft 48 of the wheel, and a pulley 49 by which the wheel may be rotated from any convenient source of power being carried by said shaft 48 between the boxes 47. Sometimes it is desirable to adjust the boxes 47 and to enable this to be done the bracket 46 has corner bearings 50 for the boxes slotted as at 51 for a guiding and binding screw 52 and apertured and threaded at 53 for the reception of an adjusting bolt 54. (See Fig. 19.) By thus enabling a ready adjustment of the emery wheel, the same may be quickly advanced to maintain an operative relation to the facing tool as the wheel wears away.

Means are also provided for sharpening the drills 12, and the same together with the instrumentalities for causing proper presentation of the drills thereto will now be described.

55 and 56 are grinding tools, the former having a straight periphery while the latter has a beveled periphery, mounted upon one of the columns 1 by brackets 57 in such position as to operate both on the side and point of the drill as it passes thereagainst in the rotation of the carrier. These grinders are rotated by pulleys 58 driven by any convenient means. To alternately present the different sides of the drills to these grinding wheels 55 and 56 in the successive rotations of the carrier, I employ mechanism for turning the drill by a step-by-step operation as the same approaches the grinders and for holding the tool in a fixed position while being engaged by the grinders, such mechanism including the following devices: 59 is a vertically disposed cam rotatable on a shaft 60 carried by a bracket 61 rigidly secured to and depending from a cross bar 62 mounted upon the fore legs 1 of the frame of the machine and spanning the space therebetween, this cam being designed to elevate or permit lowering of a sleeve 63 slidably mounted on bracket 61 the latter having a projecting flange 64 arranged to ride upon the operating edge or periphery of the cam. The cam is rotated step by step in successive rotations of the rotary carrier by a pin 65 projecting outwardly from the bed plate 8 which carries the pin 65 a sufficient distance to engage the inwardly projecting pins 66 on the cam. 67 represents a yieldable horizontal spring metal guide carried by the flange 64 of the sleeve 63 adapted when the sleeve is in its uppermost position raised thereto by the enlarged portion of the cam 59 to contact with the flat surface 68 of the upper rim 69 of the drill pulley 25 to prevent said drill pulley and drill from rotating, and when in its lowermost position whence it falls by gravity onto the reduced portions of the cam incident to the rotation of the latter, to correspondingly engage the flat surface 70 of the lower rim 71 of said pulley 25 and similarly hold the pulley and drill against rotation. Dependent upon the position of the guide 67, that is, whether the same be engaging the flat surface of the upper or lower rim, the drill incident to the continued rotation of the carrier will be similarly carried into engagement with other guides 72, 73 which will hold the drills against rotation while in engagement with the grinders 55 and 56, the guide 72 being arranged above the plane of the guide 73 and in the path of movement of the pins 74 on the top of the pulley 25 while said guide 73 is in the path of movement of pins 75 on the bottom of said pulley. Therefore, presuming that the yielding guide on the sleeve 63 is in a position indicated in Figs. 12 and 13 with the flat edge 68 of the rim 69 of the pulley engaged thereby, the drill without further rotation will pass into engagement with the upper guide 72 by alined pins 74 riding thereonto and the drill will be held in such position while passing the grinding wheel 55. The pins 74 then passing beyond the guide 72 permits engagement of the lower guide 73 by the lower pins 75 whereby the drill will be turned and held in position while presented to the grinding wheel 56. It will thus be seen that by this operation one of the sides of the tool is sharpened and one of the ends beveled, sharpened and diamond pointed. In the next rotation of the carrier the pin 65 will engage the pins 66 of the cam and rotating the latter the sleeve 63 and guide 67 will be lowered from the position shown in Figs. 12 and 13 as aforesaid whereby the guide will engage the oppositely disposed straight surface 70 of the lower rim 71 of the pulley 25, thus reversing the position occupied by the drill in the previous rotation whereby the next presentation of the drill to the grinding wheels will effect the sharpening of the other side of the drill and the beveling of the other side of the end of the drill and thus maintain a diamond point on the drill. Thus it will be appreciated that in two revolutions of the rotary carrier all cutting edges of the drill are presented to and acted on by the grinding wheels.

While I have herein disclosed one practical embodiment of my invention, said invention is clearly capable of being embodied in other forms and devices within the scope of the hereto appended claims, as will appear to those skilled in the art.

I claim:—

1. In a button-making machine, a blank-holding chuck, a shaping tool, a drill, means for supporting said chuck, tool and drill, means for rotating the chuck in one direction while the blank carried thereby is in engagement with the shaping tool, means for intermittently operating the drill to bore different portions of the blank, and means for turning the blank in a reverse direction against the back of the shaping tool to present said different portions thereof to the drill and whereby the shaping tool serves as a holder or retaining device during the drilling operation.

2. In a button-making machine, a blank-holding chuck, a drill operatively associated therewith, means for intermittently operating the drill to bore different portions of the blank, and means for turning the blank to present said different portions thereof to the drill including a series of pegs carried by the chuck, a guide against which said pegs may ride formed to accommodate said pegs when the chuck is turned, a pawl arranged normally with its jaw projecting inwardly into the path of movement of one of the pegs whereby to engage and turn the chuck, and a tail piece on said pawl adapted to be engaged by said peg when released to restore the pawl to its normal engaging position, in combination with means for moving the chuck along said guide.

3. In a button-making machine, a blank holding chuck, means for moving the same, a drill operatively associated therewith, means for intermittently operating the drill to bore different portions of the blank, and means for turning the blank to present said different portions thereof to the drill, said means including engaging portions on the chuck, and a coöperating pawl arranged to engage said engaging portions to turn the chuck and said pawl having a part arranged to be actuated by a part on the chuck to automatically reset the pawl.

4. In a button-making machine, traveling and non-traveling supports, a blank-holding chuck, a shaping tool, and a drill carried by the traveling support, said chuck, tool and drill, being mounted in a substantially fixed axial relation with respect to each other, and instrumentalities on the non-traveling support arranged to be brought into operation by the movement of the traveling support to successively and automatically cause the operation of the shaping tool and drill.

5. In a button-making machine, traveling and non-traveling supports, a blank-holding chuck, a shaping tool, and a drill carried by the traveling support, said chuck, tool and drill being mounted in a substantially fixed axial relation with respect to each other, and instrumentalities on the non-traveling support arranged to be brought into operation by the movement of the traveling support to successively and automatically cause the operation of the shaping tool and drill, in combination with means in the paths of movements of the tool and drill for feeding the same.

6. In a button-making machine, traveling and non-traveling supports, a series of bed plates carried by the traveling support, a blank-holding chuck, shaping tool, and drill mounted on each bed plate, and instrumentalities on the non-traveling support arranged to be brought into operation by the movement of the traveling support to successively and automatically cause the operation of the shaping tool and drill.

7. In a button-making machine, traveling and non-traveling supports, a bed plate carried by the traveling support, a blank-holding chuck and tool mounted on said bed-plate, devices at the opposite end of said bed-plate arranged to engage the chuck and tool, and instrumentalities on the non-traveling support arranged to be brought into operation with said devices by the movement of the traveling support to cause the tool to treat the blank.

8. In a button-making machine, a tool, means independent of the tool adapted to be thrown into engagement therewith to force the tool to the work, and automatically actuable means for gradually lengthening said forcing means whereby to cause a greater movement of the tool to accommodate for the wear thereof.

9. In a button-making machine, a tool, means for pushing the tool from its normal position into position to engage the work, and automatically actuable means for adjusting said pushing means to force the tool gradually to the greater extents from its normal position, said means comprising a pivoted lever, an adjustable presser foot at one end thereof, and a cam operatively associated with the other end thereof.

10. In a button-making machine, traveling and non-traveling supports, a drill on the traveling support, means on the non-traveling support arranged in the path of movement of the drill for sharpening the same comprising a pair of abrading wheels, arranged to act successively on said drill, and coöperating instrumentalities partly on the traveling support and partly on the non-traveling support for holding the drill against rotation while special portions thereof are being operated on by the respective wheels.

11. In a button making machine, a carrier, a group of blank working devices comprising a chuck, shaping tool and drill mounted on said carrier, the axes of said chuck, tool and drill occupying a substantially fixed position relatively to each other, and means for bringing the chuck and tools into coöperative relation to each other.

12. In combination, a blank holder, a pair of blank treating tools mounted so as to be engaged with a blank in said blank holder, means for rotating the holder while the blank is operated on by one of said tools, and means for reversing the rotation of said holder for the operation of said other tool on the blank while the blank is held by said first mentioned tool.

13. In a button-making machine, three devices, one constituting a holder and the others different blank treating tools, a carrier for shifting the same while maintaining approximately the same relative positions of the tools and holder, and means controlled by the shifting of the carrier and acting to effect the blank treating operations of the respective tools.

14. In a button making machine, traveling and non-traveling supports, a blank holding chuck, shaping tool, and drill carried by the traveling support, and instrumentalities on the non-traveling support arranged to be brought into operation by the movement of the traveling support to successively and automatically cause the operation of the shaping tool and drill, in combination with means for supporting said chuck, tool and drill in place on the traveling support, whereby the support with the chuck, tool and drill may be removed as an entity therefrom.

15. In a button making machine, traveling and non-traveling supports, a plurality of series of devices carried by the traveling support, each series being independent of the other series and comprising a button holding chuck, a shaping tool, and a drill mounted on a supporting bed or plate, and instrumentalities on the non-traveling support arranged to be brought into operation by the movement of the traveling support to successively and automatically cause the operation of the shaping tool and drill.

16. In a button-making machine, relatively traveling and non-traveling supports, a bed plate carried by the traveling support, a blank holding chuck and a tool mounted on said bed plate, pivoted bell crank levers also on said bed plate adapted to be thrown into engagement respectively with the blank holding chuck and tool, and instrumentalities on the non-traveling support arranged to be brought into engagement with said pivoted bell crank levers by the movement of the traveling support to automatically control the tool and blank holding chuck.

17. In a button-making machine, traveling and non-traveling supports, a series of bed plates carried by the traveling support, a shaping tool, a blank holding chuck and a drill mounted on each bed plate, pivoted bell crank levers also on each bed plate adapted to be thrown into engagement one with the blank holding chuck and the other with the drill, and projecting portions on the non-traveling support arranged to be brought into operation with the pivoted bell crank levers by the movement of the traveling support to successively and automatically cause the operation of the shaping tool and drill.

18. In a button-making machine, traveling and non-traveling supports, a plurality of independent button blank treating groups carried by the traveling support, each group including a blank holding chuck and drill, means for securing the group to the traveling support so that it may be detached therefrom approximately intact, and instrumentalities on the non-traveling support arranged to be brought into operation by the movement of the traveling support to successively and automatically operate each treating group.

19. In a button-making machine, traveling and non-traveling supports, a blank-holding chuck and a tool carried by the traveling support, and means for relatively shifting the chuck and tool to bring them into operative relation, said means including a pivoted lever carried by said traveling support, a ring on the non-traveling support, and an adjustable cam on the periphery of said ring arranged to engage said lever.

20. In a button-making machine, traveling and non-traveling supports, a plurality of series of blank-holding chucks and tools, and means for relatively shifting said chucks and tools to bring them into operative relation, including pivoted levers, one for each series on said traveling support, a ring on the non-traveling support, and a series of independently adjustable cams around the periphery of said ring arranged to engage said levers.

21. In a button-making machine, traveling and non-traveling supports, a tool on the traveling support, means on the non-traveling support arranged in the path of movement of the tool for automatically sharpening the same, and coöperating instrumentalities on the traveling and non-traveling support for turning the implement and holding the same while different portions thereof are presented to said sharpening means.

22. In a button-making machine, traveling and non-traveling supports, a drill on the traveling support, grinding means on the non-traveling support arranged in the path of movement of the drill, and coöperating instrumentalities on the traveling and non-traveling supports for turning the drill and holding the same in different positions relative to said grinding means.

23. In a button-making machine, a rotary carrier, a plurality of blank treating units mounted on said carrier, each comprising a blank holding chuck, a shaping tool, and a drill bearing a substantially fixed axial relation to each other, means to rotate the chucks when in operative relation to the shaping tool, means for stopping rotation of the chucks after the operation of the shaping tools, means for rotating the drillls, and means for intermittently turning the chucks to present different portions of the blanks to be bored by the drills.

24. In a button-making machine, a blank-holding chuck, a shaping tool, and a drill, means to rotate the chuck when in operative relation to the shaping tool, means for stopping the rotation of the chuck after the operation of the shaping tool, means for operating the drill, and means for intermittently turning the chuck in a reverse direction under the shaping tool to present different portions thereof to be bored by the drill.

25. In a button-making machine, traveling and non-traveling supports, a drill on the traveling support, means on the non-traveling support arranged in the path of movement of the drill for sharpening the same, means for turning the drill about its own axis to alternately present different surfaces thereof to the sharpening means to form an angular point, and means for holding the drill against such turning movement to keep the same stationary for a substantial period of time while its respective surfaces are being acted on by said sharpening means.

26. In a button making machine, traveling and non-traveling supports, a series of bed plates carried by the traveling support, a blank holding chuck and drill mounted on each bed plate, instrumentalities on the non-traveling support arranged so as to automatically bring the chuck and drill into operative relation with each other by the movement of the traveling support past the non-traveling support, and means for securing the bed plates in place.

27. In a button making machine, traveling and non-traveling supports, blank holding chucks, shaping tools, and drills carried by the traveling support, and sharpening instrumentalities on the non-traveling support arranged to act automatically to engage said shaping tools and drills.

28. In a button making machine, traveling and non-traveling supports, blank holding chucks, shaping tools, and drills carried by the traveling support, and sharpening instrumentalities on the non-traveling support arranged to act automatically to sharpen all of the said shaping tools and drills, in combination with means controlled by the relative movement of the traveling and non-traveling supports for holding the parts to be sharpened in a predetermined stationary position while being acted on by the sharpening means.

29. In combination, a blank holder, a pair of blank treating tools adapted to be successively engaged with a blank in said blank holder, means for initially causing the operation of one of the tools on the blank, and means for subsequently effecting the operation of the other of said tools on the blank while the blank is held by said first mentioned tool.

30. In a button making machine, a carrier for shifting the blank treating devices to different operating positions, said devices including a drill on the carrier, means arranged to engage the drill during a part of its movement for sharpening the drill, and means for presenting different sides or edges of the drill to said sharpening means and for holding the drill against movement around its axis while thus engaged.

31. In a button making machine, traveling and non-traveling supports, a plurality of groups of devices carried by the traveling support, each of said groups being independent of all the other groups and comprising a button holding chuck, a tool, and an independent supporting bed or plate on which the chuck and tool are mounted, and instrumentalities on the non-traveling support arranged to be brought into operation by the movement of the traveling support to successively and automatically cause the operation of the tools.

32. In a button making machine, traveling and non-traveling supports, a blank holding chuck, and a drill carried by the traveling support, a pivoted device free at one of its ends also carried by said traveling support, and instrumentalities on the non-traveling support arranged to be brought into engagement with said device by the movement of the traveling support to cause said free end thereof to engage and effect the operation of the drill.

33. In a button making machine, traveling and non-traveling supports, a blank holding chuck, and a drill carried by the traveling support, a pivoted bell crank lever normally free at its ends also carried by said traveling support, and means on the non-traveling support arranged to be brought into engagement with one of the ends of said pivoted bell crank lever by the movement of the traveling support to cause the opposite end thereof to engage and automatically cause the operation of the drill.

34. In a button making machine, a tool, a holder therefor, means for engaging the tool to force the same longitudinally of the holder to adjust the position thereof, and other means whereby the tool may be bodily shifted independently of said holder and fixed in substantially different lateral positions of adjustment therein.

35. In a button making machine, a tool, a holder therefor, and instrumentalities whereby the tool may be bodily shifted in a lateral direction within said holder and independently of said holder and for securing the tool in its laterally adjusted position in the holder.

36. In a button making machine, a traveling support a supporting plate fixed to said traveling support, a blank treating tool and holder therefor arranged at an inclination in said supporting plate, means for fastening said holder in fixed position on said plate, and a button-blank holding device adapted to be shifted automatically during the movement of the traveling support toward and from said tool holder to effect operation of the tool on a blank carried thereby, in combination with means for rotating the button-blank holding device when in operative association with the tool.

37. In a button making machine, a traveling support a supporting plate fixed to said traveling support, a blank treating tool and holder therefor arranged at an inclination in said supporting plate, means for fastening the holder in fixed position on said plate, a button-blank holding device adapted to be shifted automatically during the movement of the traveling support toward and from said tool holder to effect operation of the tool on a blank carried thereby, and means for feeding the tool longitudinally of the holder, in combination with means for rotating the button-blank holding device when in operative association with the tool.

38. In a button making machine, a supporting plate, a blank treating tool and holder therefor arranged at an inclination in said supporting plate, means for fastening the holder in fixed position on said plate, a button-blank holding device adapted to be shifted toward and from said tool holder to effect operation of the tool on a blank carried thereby, means for feeding the tool longitudinally of the holder, and means for adjusting the tool to different lateral positions in its holder.

39. In a button making machine, a traveling support a supporting plate fixed to said traveling support, a blank treating tool and holder therefor arranged at an inclination in said supporting plate, means for adjusting and fastening said holder in different positions on said plate, and a button-blank holding device adapted to be shifted automatically during the movement of the traveling support toward and from said tool holder to effect operation of the tool on a blank carried thereby, in combination with means for rotating the button-blank holding device when in operative association with the tool.

40. In a button making machine, a drill, means for normally retracting the same, and for pushing the drill from its normal position into position to engage the work, including automatically acting means for gradually increasing the extent of the pushing operation.

41. In a machine of the character described, a tool holder having a portion formed with a tool supporting surface, opposing tool clamping means carried by the holder, and tool positioning devices carried by such portion at the sides of the tool and between said tool supporting surface and said tool clamping means.

42. In a machine of the character described, a tool holder having a portion formed with a tool supporting surface, opposing tool clamping means carried by the holder, and tool positioning devices carried by said portion at the side of the tool and between said tool supporting surface and said tool clamping means, in combination with means for forcing the tool longitudinally of the holder.

43. In a button making machine, traveling and non-traveling supports, a series of blank holding chucks, and a corresponding series of tools carried by the traveling support, coöperating instrumentalities on said supports controlled by the movement of the traveling support for successively and automatically operating the tools, and means also controlled by the movement of the traveling support to correspondingly successively and automatically feed the tools to accommodate for the wear thereof, said means being formed so that the feeding of each tool follows its independent operation and is independent of the feeding of the other tools.

In testimony whereof I affix my signature in presence of two witnesses.

FRED M. HOPKINS.

Witnesses:
  F. W. SMITH,
  LOUIS BLOCK.